Feb. 2, 1965
R. C. ECKENFELDER
3,168,693
TRANSISTORIZED VOLTAGE REGULATOR
Filed Dec. 29, 1958
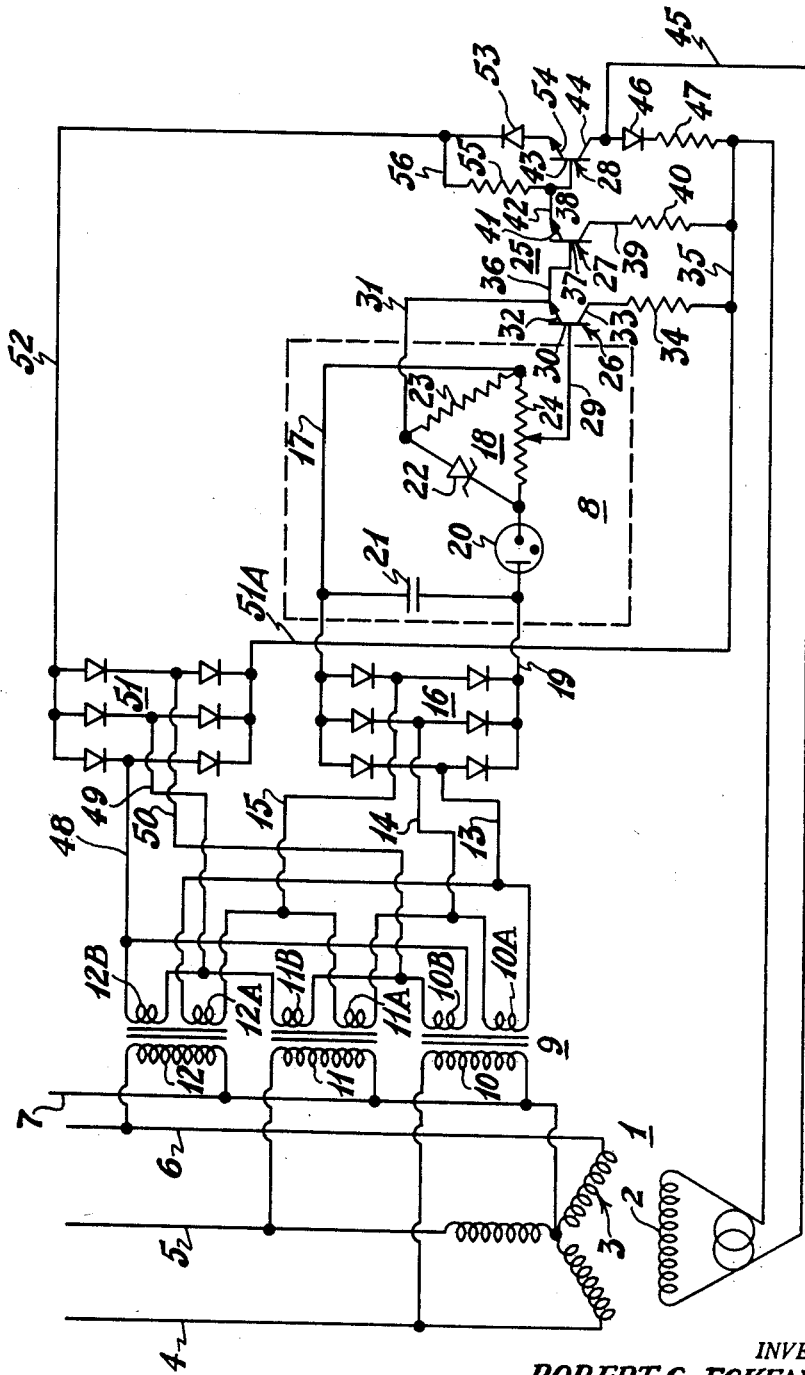
INVENTOR.
ROBERT C. ECKENFELDER
BY
*James M. Nickels*
ATTORNEY

United States Patent Office 3,168,693
Patented Feb. 2, 1965

3,168,693
TRANSISTORIZED VOLTAGE REGULATOR
Robert C. Eckenfelder, Teaneck, N.J., assignor to The Bendix Corporation, a corporation of Delaware
Filed Dec. 29, 1958, Ser. No. 783,484
15 Claims. (Cl. 322—28)

The present invention relates to voltage regulators and more particularly to a transistorized voltage regulator for an A.C. generator.

Heretofore, various types of voltage regulators have been utilized, such as variable resistance devices. With the increased requirements to withstand shock and vibration, regulators having movable parts have proven unsatisfactory. Various types of static regulators have been tried but are either expensive, difficult to manufacture or do not provide the desired accuracy.

The present invention provides a transistorized voltage regulator in which the voltage ripple is used to modulate the pulse width of the output of a sensing bridge which drives a transistor amplifier.

It is an object of the present invention to provide an improved voltage regulator.

Another object of the invention is to provide a novel transistorized voltage regulator.

Another object of the invention is to provide an improved voltage regulator in which the power dissipation is held to a minimum.

Another object of the present invention is to provide an improved voltage regulator that is light in weight and easy to manufacture.

The above and other objects and features of the invention will appear more fully hereinafter from a consideration of the following description taken in connection with the accompanying drawing wherein one embodiment of the device is illustrated by way of example.

In the drawing:

The single figure is a schematic diagram of a system embodying the invention.

Reference is now made to the drawing wherein an A.C. generator is indicated generally by the numeral 1 and having an exciting winding 2 and a three phase output winding 3. While a three phase generator has been illustrated, it is understood that it may be single phase or multiphase. Output conductors 4, 5 and 6 are connected to the winding 3. Also, a neutral conductor 7 is connected to the midpoint of the winding 3.

A novel feature of the invention is the voltage regulator indicated generally by the numeral 8. The regulator 8 is energized from the generator 1 by a transformer 9. The transformer 9 is illustrated as being three phase and has primary windings 10, 11 and 12, each having one end thereof connected to the neutral conductor 7 and the other end connected to output conductors 4, 5 and 6 respectively. The primary winding 10 has secondary windings 10A and 10B. Likewise, primary winding 11 has secondary windings 11A and 11B and primary winding 12 has secondary windings 12A and 12B. The secondary windings 10A, 11A and 12A are delta connected and the output therefrom connected by conductors 13, 14 and 15 to the input of a full wave rectifier 16. One side of the output of the rectifier 16 is connected by conductor 17 to one input terminal of a reference bridge 18. The other side of the output of the rectifier 16 is connected by conductor 19 and gas diode 20 to the other input terminal of the bridge 18. A capacitor 21 is connected across the output of the rectifier 16.

The reference bridge 18 has a silicon zener diode 22 in one leg, a resistor 23 in an adjoining leg and a tapped resistor 24 forming the other legs thereof. The output of the bridge 18 is amplified by a transistor amplifier indicated generally by the numeral 25 and includes transistors 26, 27 and 28. One output terminal of the bridge 18 is connected by conductor 29 to base 30 of the transistor 26 while the other output terminal of the bridge 18 is connected by conductor 31 to emitter 32 of the transistor 26. The transistor 26 has a collector connected by conductor 33 and resistor 34 to a conductor 35. The emitter 32 of the transistor 26 is also connected by conductor 36 to base 37 of transistor 27 which has a collector 38 connected by conductor 39 and resistor 40 to the conductor 35. In addition the transistor 27 has an emitter 41 connected by conductor 42 to base 43 of the transistor 28. The transistor 28 has a collector 44 connected to conductor 45. The conductors 35 and 45 are connected to the excitation winding 2 of the generator 1 by conventional slip rings. A rectifier 46 and resistor 47 are connected across the conductors 35 and 45.

The amplifier 25 is powered from the secondary windings 10B, 11B and 12B of the transformer 9. The secondary windings 10B, 11B and 12B are delta connected and the output therefrom connected by conductors 48, 49 and 50 to the input of a full wave rectifier 51.

One output terminal of the rectifier 51 is connected by conductor 51a to the conductor 35. The other output terminal is connected by conductor 52 and rectifier 53 to emitter 54 of the transistor 28. A resistor 55 is connected by conductor 56 between the conductors 42 and 52.

In operation, the line voltage of the alternator is applied through the transformer 9 to the full wave rectifier 16. The D.C. output voltage from the rectifier is then connected across the reference bridge which is balanced and so connected that a line voltage increase gives a decrease in output and a decrease in line voltage gives an increase in output. The D.C. output voltage from the rectifier has a ripple component which is a percentage of the total voltage. A portion of the D.C. component of the voltage is dropped across the cold cathode gas diode and the remainder in which the ripple component has increased percentage-wise is impressed across the reference bridge. The capacitor connected across the bridge shapes the ripple voltage to approximate a saw-toothed wave form.

The output of the reference bridge is a saw-toothed approximation with an average D.C. level inversely proportional to the A.C. line voltage. This output is applied to the transistor amplifier which is designed to be well overdriven by the saw-toothed wave form. The output of the amplifier is approximately a square wave. Any change in the D.C. level of the input changes the width of the square wave output. Extreme line voltage changes, such for example as transients due to loading, cause sufficient change in the applied D.C. level to turn the first stage completely "on" or "off" depending on whether an overvoltage or undervoltage occurs.

The output of the first stage of the amplifier is applied to two additional amplifier stages, each being designed to be slightly overdriven. Thus, each stage is either in an "on" or "off" condition. With the aforenoted arrangement the power dissipation of each stage is kept to a minimum enabling the device to operate at higher ambient temperatures.

The amplifier is illustrated as being powered from the line voltage of the alternator through a rectifier, however, it is understood that the power could be obtained from other sources. Also, the output of the regulator could energize and control the field of an exciter which in turn would furnish the excitation for the A.C. generator.

Although only one embodiment of the invention has been illustrated and described, various changes in the form and relative arrangement of the parts, which will now appear to those skilled in the art, may be made without departing from the scope of the invention.

What is claimed is:

1. A voltage regulator for an alternating current generator having an excitation winding and output windings, comprising a reference bridge, means including a full wave rectifier for connecting the reference bridge to the output of said generator, said means providing an input voltage to said bridge having a D.C. component and a ripple component, means for shaping the ripple voltage to a saw-toothed approximation, said bridge being proportioned so that an increase in output voltage of said generator over a predetermined value gives a decrease in output from said bridge and a decrease in output voltage of said generator under said predetermined value gives an increase in output from said bridge, the output of said bridge being a saw-toothed approximation with an average D.C. level inversely proportional to said generator output voltage, a three stage transistor amplifier with each stage designed to be slightly overdriven, means connecting the output of said bridge to the input of said amplifier.

2. In electrical control apparatus for producing periodic output pulses whose width varies with an electrical quantity associated with an alternating current circuit, the combination comprising, first means connected in circuit relation with said alternating current circuit for producing a unidirectional output voltage having a ripple component, the magnitude of said output voltage varying with said electrical quantity, second means connected in circuit relation with said first means for modifying said ripple component of said unidirectional voltage to be substantially triangular, third means connected in circuit relation with said second means for obtaining the difference between said modified unidirectional voltage and a reference voltage, the difference voltage being substantially triangular in shape and having a direct-current component whose magnitude varies with said electrical quantity, and switching means connected in circuit relation with said third means to be responsive to said difference voltage for producing periodic output pulses whose width varies with said electrical quantity.

3. In electrical control apparatus for producing periodic output pulses whose width varies with an electrical quantity associated with an alternating current circuit, the combination comprising, first means connected in circuit relation with said alternating current circuit for producing a unidirectional output voltage having a ripple component, the magnitude of said output voltage varying with said electrical quantity, second means connected in circuit relation with said first means for modifying said ripple component of said unidirectional voltage to be substantially triangular, said second means comprising a capacitive reactance, third means connected in circuit relation with said second means for obtaining the difference between said modified unidirectional voltage and a reference voltage, the difference voltage being substantially triangular in shape and having a direct-current component whose magnitude varies with said electrical quantity, and switching means connected in circuit relation with said third means to be responsive to said difference voltage for producing periodic output pulses whose width varies with said electrical quantity.

4. In electrical control apparatus for producing periodic output pulses whose width varies with an electrical quantity associated with an alternating current circuit, the combination comprising, first means connected in circuit relation with said alternating current circuit for producing a unidirectional output voltage having a ripple component, the magnitude of said output voltage varying with said electrical quantity, second means connected in circuit relation with said first means for modifying said ripple component of said unidirectional voltage to be substantially triangular, third means connected in circuit relation with said second means for obtaining the difference between said modified unidirectional voltage and a reference voltage, the difference voltage being substantially triangular in shape and having a direct-current component whose magnitude varies with said electrical quantity, and semiconductor switching means connected in circuit relation with said third means to be responsive to said difference voltage for producing periodic output pulses whose width varies with said electrical quantity.

5. In electrical control apparatus for producing periodic output pulses whose width varies with an electrical quantity associated with an alternating current circuit, the combination comprising, first means connected in circuit relation with said alternating current circuit for producing a unidirectional output voltage having a ripple component, the magnitude of said output voltage varying with said electrical quantity, second means connected in circuit relation with said first means for modifying said ripple component of said unidirectional voltage to be substantially triangular, said second means comprising a capacitive reactance, third means connected in circuit relation with said second means for obtaining the difference between said modified unidirectional voltage and a reference voltage, the difference voltage being substantially triangular in shape and having a direct-current component whose magnitude varies with said electrical quantity, and switching transistor means connected in circuit relation with said third means to be responsive to said difference voltage for producing periodic output pulses whose width varies with said electrical quantity.

6. In control apparatus for varying the excitation current applied to the excitation field winding of a dynamoelectric machine disposed to supply electric power to a load circuit through output terminals, the combination comprising, first means for supplying an alternating current control signal, second means connected in circuit relation with said first means for obtaining a unidirectional voltage which includes ripple and which varies with said control signal, third means connected in circuit relation with said second means for changing the ripple component of said unidirectional voltage to substantially a triangular wave form, fourth means connected in circuit relation with said third means for comparing said changed unidirectional voltage with a reference voltage to obtain a difference voltage having substantially a triangular waveform, the magnitude of the latter difference voltage varying with that of said control signal, and switching means connected in circuit relation between said fourth means and said field winding to be responsive to the magnitude of said difference voltage for producing periodic output pulses whose width varies with said control signal and which are applied to said field winding as excitation current.

7. In control apparatus for varying the excitation current applied to the excitation field winding of a dynamoelectric machine disposed to supply electric power to a load circuit through output terminals, the combination comprising, first means for supplying an alternating current control signal, second means connected in circuit relation with said first means for obtaining a unidirectional voltage which includes a ripple component and which varies with said control signal, third means connected in circuit relation with said second means for changing the ripple component of said unidirectional voltage to substantially a triangular waveform, said third means comprising a capacitive reactance, fourth means connected in circuit relation with said third means for comparing said changed unidirectional voltage with a reference voltage to obtain a difference voltage having substantially a triangular waveform and a direct-current component, the magnitude of the latter difference voltage varying with that of said control signal, and switching means connected in circuit relation between said fourth means and said field winding to be responsive to the magnitude of said difference voltage for producing periodic output pulses whose width varies with said control signal and which are applied to said field winding as excitation current.

8. In control apparatus for varying the excitation current applied to the excitation field winding of a dynamoelectric machine disposed to supply electric power to a load circuit through output terminals, the combination comprising, first means for supplying an alternating current control signal, second means connected in circuit relation with said first means for obtaining a unidirectional voltage which includes a ripple component and which varies with said control signal, third means connected in circuit relation with said second means for changing the ripple component of said unidirectional voltage to substantially a triangular waveform, fourth means connected in circuit relation with said third means for comparing said changed unidirectional voltage with a reference voltage to obtain a difference voltage having substantially a triangular waveform, the magnitude of the latter difference voltage varying with that of said control signal, and semiconductor switching means connected in circuit relation between said fourth means and said field winding to be responsive to the magnitude of said difference voltage for producing periodic output pulses whose width varies with said control signal and which are applied to said field winding as excitation current.

9. In control apparatus for varying the excitation current applied to the excitation field winding of a dynamoelectric machine disposed to supply electric power to a load circuit through output terminals, the combination comprising, first means for supplying an alternating current control signal, second means connected in circuit relation with said first means for obtaining a unidirectional voltage which includes a ripple component and which varies with said control signal, third means connected in circuit relation with said second means for changing the ripple component of said unidirectional voltage to substantially a triangular waveform, said third means comprising a capacitive reactance, fourth means connected in circuit relation with said third means for comparing said changed unidirectional voltage with a reference voltage to obtain a difference voltage having substantially a triangular waveform and a direct-current component, the magnitude of the latter difference voltage varying with that of said control signal, and semiconductor switching means connected in circuit relation between said fourth means and said field winding to be responsive to the magnitude of said difference voltage for producing periodic output pulses whose width varies with said control signal and which are applied to said field winding as excitation current.

10. In control apparatus for controlling the excitation current applied to the excitation field winding of a dynamoelectric machine disposed to supply electric power to a load circuit through output terminals, the combination comprising, first means connected in circuit relation with said output terminals for obtaining a unidirectional voltage which varies with the output voltage of said machine and includes a ripple component, second means connected in circuit relation with said first means for modifying said ripple component of said unidirectional voltage to a substantially triangular voltage waveform, third means connected in circuit relation with said second means for subtracting substantially a predetermined voltage from said modified unidirectional voltage to obtain substantially a triangular voltage having a direct-current component, the magnitude of the direct-current component of said triangular voltage varying with the output voltage of said machine, and switching means connected between said third means and said field winding to be responsive to the magnitude of the direct-current component of said triangular voltage for producing periodic output pulses whose width varies with the latter magnitude, said pulses being applied to said field winding as excitation current to maintain the output voltage of said machine at substantially a predetermined value.

11. In a regulator system for maintaining the output voltage of an alternator having an excitation field winding and output terminals at substantially a predetermined value, the combination comprising, first means connected in circuit relation with the output terminals of said alternator for obtaining a unidirectional voltage which includes a ripple component and which varies with said output voltage, second means connected in circuit relation with said first means for converting the ripple component of said unidirectional voltage to substantially a triangular waveform, third means connected in circuit relation with said second means for comparing the converted unidirectional voltage with substantially a predetermined voltage to obtain a difference voltage having substantially a triangular waveform and a direct-current component, switching means connected in circuit relation with said third means to be responsive to said difference voltage for producing periodic output pulses having a width which varies with said output voltage and fourth means connected between said switching means and said field winding for applying said pulses to said field winding as excitation current.

12. In a regulator system for maintaining the output voltage of an alternator having an excitation field winding and output terminals at substantially a predetermined value, the combination comprising, first means connected in circuit relation with the output terminals of said alternator for obtaining a unidirectional voltage which includes a ripple component and which varies with said output voltage, second means connected in circuit relation with said first means for converting the ripple component of said unidirectional voltage to substantially a triangular waveform, said second means comprising a capacitive reactance, third means connected in circuit relation with said second means for comparing the converted unidirectional voltage with substantially a predetermined voltage to obtain a difference voltage having substantially a triangular waveform, switching means connected in circuit relation with said third means to be responsive to said difference voltage for producing periodic output pulses having a width which varies with said output voltage and fourth means connected between said switching means and said field winding for applying said pulses to said field winding as excitation current to thereby maintain said output voltage at substantially said predetermined value.

13. In a regulator system for maintaining the output voltage of an alternator having an excitation field winding and output terminals at substantially a predetermined value, the combination comprising, first means connected in circuit relation with the output terminals of said alternator for obtaining a unidirectional voltage which includes a ripple component and which varies with said output voltage, second means connected in circuit relation with said first means for converting the ripple component of said unidirectional voltage to substantially a triangular waveform, third means connected in circuit relation with said second means for comparing the converted unidirectional voltage with substantially a predetermined voltage to obtain a difference voltage having substantially a triangular waveform, semiconductor switching means connected in circuit relation with said third means to be responsive to said difference voltage for producing periodic output pulses having a width which varies with said output voltage and fourth means connected between said switching means and said field winding for applying said pulses to said field winding as excitation current.

14. In a regulator system for maintaining the output voltage of an alternator having an excitation field winding and output terminals at substantially a predetermined value, the combination comprising, first means connected in circuit relation with the output terminals of said alternator for obtaining a unidirectional voltage which includes a ripple component and which varies with said output voltage, second means connected in circuit relation with said first means for converting the ripple component of said unidirectional voltage to substantially a triangular waveform, said second means comprising a capacitive reactance, third means connected in circuit relation with said second means for comparing the converted unidirectional voltage with substantially a predetermined voltage to obtain a difference voltage having substantially a triangular waveform, switching transistor means connected in circuit relation with said third means to be responsive to said difference voltage for producing periodic output pulses having a width which varies with said output voltage and fourth means connected between said switching means and said field winding for applying said pulses to said field winding as excitation current to thereby maintain said output voltage at substantially said predetermined value.

15. In a regulator system for maintaining the output voltage of an alternator having an excitation field winding and output terminals at substantially a predetermined value, the combination comprising, rectifying means connected in circuit relation with the output terminals of said alternator for obtaining a unidirectional voltage which includes a ripple component and which varies with said output voltage, first means connected in circuit relation with said rectifying means for converting the ripple component of said unidirectional voltage to substantially a triangular waveform, second means connected in circuit relation with said first means for comparing the converted unidirectional voltage with substantially a predetermined voltage to obtain a difference voltage having substantially a triangular waveform, semiconductor switching means connected in circuit relation with said second means to be responsive to said difference voltage for producing periodic output pulses having a width which varies with said output voltage and third means connected between said switching means and said field winding for applying said pulses to said field winding as excitation current.

References Cited in the file of this patent
UNITED STATES PATENTS

| | | |
|---|---|---|
| 2,740,086 | Evans et al. | Mar. 27, 1956 |
| 2,809,301 | Short | Oct. 8, 1957 |
| 2,809,339 | Guggi | Oct. 8, 1957 |
| 2,896,149 | Lowry et al. | July 21, 1959 |